United States Patent [19]
Veneria

[11] 3,776,675
[45] Dec. 4, 1973

[54] INJECTION MOULDING PRESS WITH MEANS FOR SEPARATING SCRAP MATERIAL FROM THE MOLDED ARTICLES

[75] Inventor: Giovanni Bessolo Veneria, Ivrea, Italy

[73] Assignee: Ing. C. Olivetti & C. S. p.A., Ivrea, Italy

[22] Filed: Sept. 10, 1971

[21] Appl. No.: 179,363

[30] Foreign Application Priority Data
Sept. 18, 1970 Italy.......................... 70144A/70

[52] U.S. Cl............... 425/139, 53/59 R, 209/74 R, 425/21.5, 425/DIG. 51, 425/444
[51] Int. Cl............................................... B29f 1/14
[58] Field of Search............ 425/139, 444, DIG. 51, 425/218, 215, 216, 217, DIG. 806, DIG. 46; 53/59 R, 78; 209/72 R, 74 R

[56] References Cited
UNITED STATES PATENTS
3,393,428  7/1968  Kowalski.................. 425/444 X
3,081,588  3/1963  Klapes et al............. 53/78
2,515,965  7/1950  Nurnberg.................. 53/59 R X
3,213,490  10/1965 Johnson................... 425/444
3,133,624  5/1964  Craig....................... 53/78 X
2,523,517  9/1950  Potter..................... 53/59 R X
2,995,775  8/1961  Schnitzius et al........ 425/217
3,418,694  12/1968 Strauss.................... 425/DIG. 46
3,543,924  12/1970 Ryan....................... 209/74 R
3,669,592  6/1972  Miller...................... 425/217 X
3,672,803  6/1972  Rees........................ 425/217 X Primary Examiner—J. Spencer Overholser
Assistant Examiner—David S. Safran
Attorney—Harold J. Birch et al.

[57] ABSTRACT

An injection-moulding press is arranged to eject the moulded article and the deadhead at different moments. A deflector is arranged under the die from which the articles and deadheads are ejected, and is moved between two positions during the interval between the ejection of an article and a deadhead. In one position, the delfector guides a falling article into a collection bin for articles, and in the second position it guides a falling deadhead into a bin for deadheads. Manual sorting of the articles from the deadheads is thus avoided.

1 Claim, 9 Drawing Figures

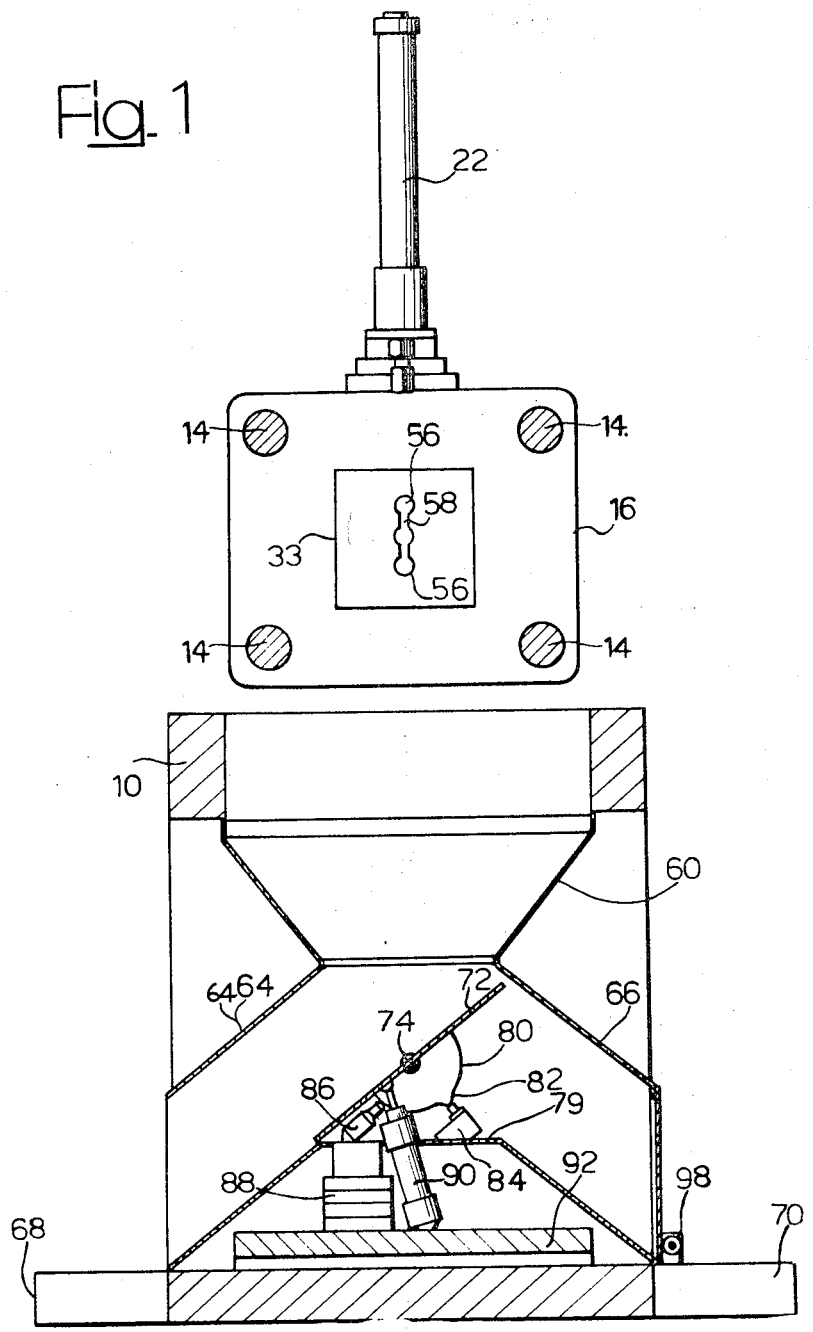

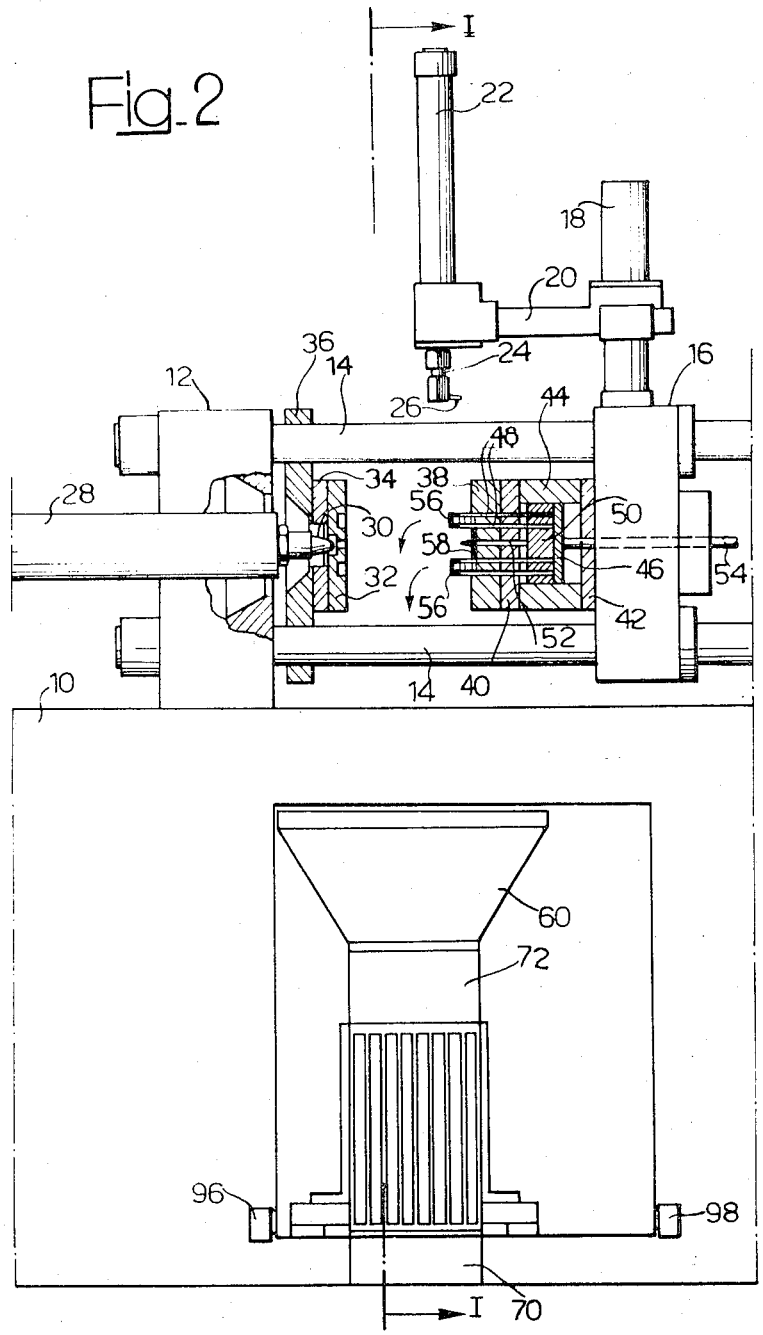

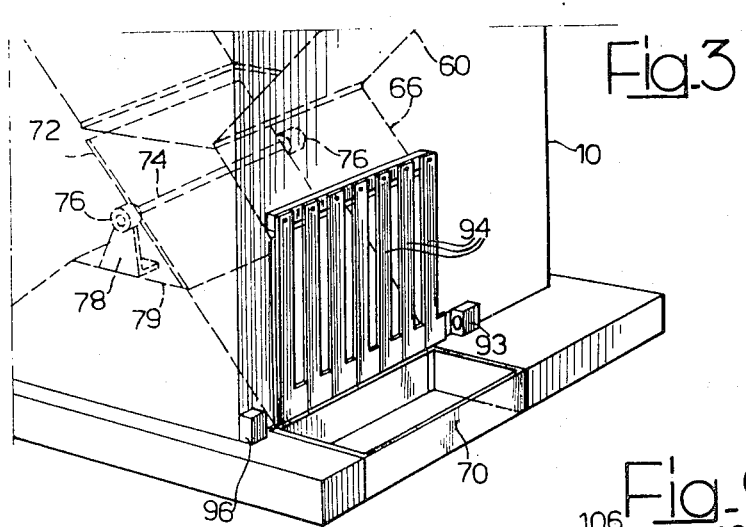
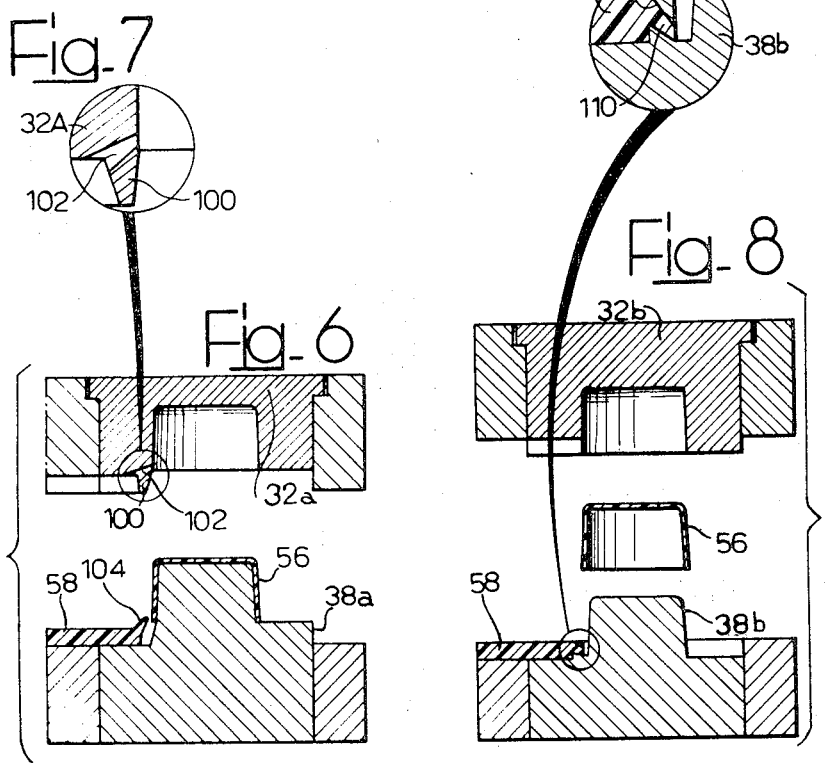

INJECTION MOULDING PRESS WITH MEANS FOR SEPARATING SCRAP MATERIAL FROM THE MOLDED ARTICLES

This invention relates to injection-moulding presses such as are used for moulding articles from thermoplastic material.

In such presses, the article is formed together with a deadhead (otherwise known as a sprue or moulding flash). Both the article and the deadhead are ejected from the press to clear the dies for the formation of the next article. It is known to separate the article from the deadhead during the opening of the press or during ejection and two particular manners of ensuring such separation are described below. It is also known to eject the article and the deadhead at different times from the press, the main ejector mechanism making a stroke that is separated into two partial strokes.

In the past, it has been customary for the articles and the deadhead to fall from the press as they are ejected, and to gravitate into a collection bin. The articles are then sorted by hand from the deadheads, which are recycled. Such sorting is time-consuming and therefore costly, but as far as the applicant is aware no automatic sorting means has yet been devised.

The object of the invention is to remedy this lacuna by providing automatic means in an injection-moulding press to sort the articles from the deadheads.

According to the invention, an injection-moulding press having means to separate a moulded article from a deadhead to which it is initially joined, and means to eject the article and the deadhead at times separated by an interval, and a chute down which the article and deadhead fall on ejection, is characterised by a deflector located in the chute and movable between a first position in which an article falling down the chute is guided into a container for such articles, and a second position in which a deadhead falling down the chute is guided into a container for deadheads; and including means to move the deflector between its first and second positions in the intervals between the ejection of the articles and the deadheads.

Preferably, the chute is branched, one branch leading to the container for articles and the second to the container for deadheads, the deflector being located at the fork of the branches.

An embodiment of the invention is described below with reference to the accompanying drawings, in which:

FIG. 1 is a schematic vertical transverse section through an injection-moulding press, taken on line I—I in FIG. 2;

FIG. 2 is a longitudinal view in elevation, partly sectioned, of the press of FIG. 1;

FIG. 3 is a perspective view of the lower part of the press of FIGS. 1 and 2, certain interior components being shown in ghost lines;

FIG. 6 is a simplified sectional view on an enlarged scale of a pair of dies which might be used in the press of the preceding figures;

FIG. 7 is a view on an enlarged scale of the circle in FIG. 6;

FIG. 8 is similar view to that of FIG. 6 of an alternative pair of dies which might be used in the press of FIGS. 1 to 5; and FIG. 9 is a view on an enlarged scale of the circle in FIG. 8.

Figure 4:
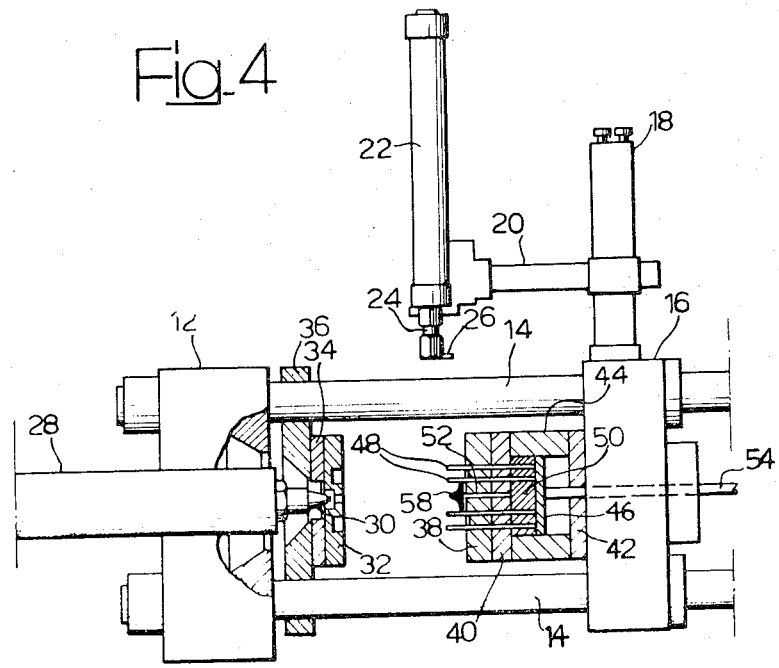
FIG. 4 is a view similar to FIG. 2 of the upper part of the press of the preceding figures, at a different phase in the operating cycle from that seen in FIG. 2.

The press of FIGS. 1 to 5 has the customary fixed base 10 above which is mounted a fixed injection head 12 (FIG. 2) carrying longitudinal guide rods 14 on which a movable head 16 slides under the action of a hydraulic cylinder (not seen). Fixed on the head 16 is a column 18 carrying an arm 20 that extends longitudinally, a hydraulic cylinder 22 being mounted vertically at its end. The cylinder 22 has a piston shaft 24 that is downwardly extendable and carries a brush 26 whose purpose is described later.

Passing through the fixed head 12 is a tubular member 28 carrying the customary nozzle 30 for the injection of molten plastics material into a cavity defined between a female die 32 connected to the fixed head 12 through backing plates 34 and 36, and a male die 38 fixed to the movable head 16 through backing plates 40 and 42 and an intermediate annular body 44. The body 44 houses a first ejector plate 46 to which are attached a plurality of article ejector pins 48, and a second ejector plate 50 to which is attached a single central deadhead ejector pin 52. The plates 46 and 50 are moved relatively to the body 44 in a known way by a rod 54 passing through the plate 42 and the head 16, and actuated by a hydraulic cylinder that is not illustrated. In the press seen in FIGS. 1 to 5, two cup-like articles 56, 56 are moulded in each operating cycle, being joined initially by a deadhead 58.

The base 10 has a chute 60 into which articles 56 and deadheads 58 are adapted to fall under gravity when ejected from the mould cavity.

A press with the general characteristics so far described is known in the art. The invention provides the features that the chute 62 divides into two branches 64 and 66 (FIG. 1). The branch 64 leads into a collection bin 68 for articles 56, and the branch 66 leads to a bin 70 for deadheads 58. At the fork of the branches 64 and 66 is located a deflector 72 in the form of a plate to which is attached a central transverse shaft 74 (FIG. 3) that is journalled in fixed bearings 76 carried by lugs 78 attached to a fixed part 79 of the base 10. Fixed to one surface of the deflector 72 is a cam 80 (FIG. 1) which carries a projection 82. Also connected to the fixed part 79 are two microswitches 84 and 86 spaced apart in the path of the projection 82 as it moves with the deflector 72 in oscillating movement about the axis of the shaft 74. The microswitches 84 and 86 are connected in a circuit, not illustrated, that includes an electrovalve 88 which controls the extension or retraction of a double-acting pneumatic cylinder 90 connected between the deflector 72 and a fixed part 92 of the base 10. The deflector 72 is movable between a first inclined position seen in FIG. 1 in which it closes the branch 66 of the chute 60, so that articles 56 falling down the chute 60 will be guided into the bin 68, and a second inclined position seen in FIG. 5. In this second position, the deflector 72 closes the branch 64 and guides falling deadheads 58 into the branch 66 so that they are collected in the bin 70.

In the first position (FIG. 1) of the deflector 72, the projection 82 on the cam 80 closes the microswitch 84.

In the second position (FIG. 5), the projection 82 closes the microswitch 86.

As is best seen in FIG. 3, the lower end of the branch 66 is closed by a plurality of vertical strips 94 which are hinged at their upper ends to the base 10 and are movable independently of each other. They are so spaced that a deadhead 58 falling down the branch 66 will swing at least one strip 94 away from its normal position before the deadhead 58 enters the bin 70. A light emitter 96 and a photocell unit 98 are mounted in the base 10 in position such that any strip 94 deflected outwardly by a falling deadhead 58 will interrupt a light beam emitted by the emitter 96 and falling on the photo-cell unit 98, thereby actuating this unit. The effect of this actuation is discussed later.

One suitable form of die pair for use in the press described so far is seen in FIGS. 6 and 7. The male die member is designated 38a and the female member 32a. Formed on the female member 32a is a projection 100 which is pierced by a hole 102 known as a tunnel. In practice, when the dies are closed and material is injected into the die cavity, it enters the female member through the tunnel 102. When moulding of an article 56 is completed, the article 56 is joined to the deadhead 58 by a nib 104 of the plastics material which fills the tunnel 102. The nib 104 is thinnest, and therefore weakest, at its junction with the article 56. From the geometry of this arrangement, it is obvious that the nib 104 will be severed from the article 56 as soon as the press is opened, i.e. as soon as the male member 38a, is drawn away from the female member 32a.

In the die pair of FIGS. 8 and 9, a tunnel 106 is formed in a projection 108 on the male member 38b, giving rise to a nib 110 that is again attached at its weakest point to the article 56 and is more strongly attached to the deadhead 58. It will be obvious that opening of the press will not sever the nib 110 to separate the article 56 from the deadhead 58. Such separation occurs only in the first phase of ejection, when the ejector pins (not seen in FIGS. 8 and 9) force the article 56 away from the male member 38b.

In the following description it will be assumed that the die pair used in the press of FIGS. 1 to 5 has a tunnel on the male member, and is thus of the type seen in FIGS. 8 and 9.

When injection and cooling have been completed, the press is opened. At this stage the deflector 72 is in its first position (FIG. 1) and the brush 26 is raised (FIG. 2). The articles 56 and deadhead 58 remain attached to the male die member 38, and are connected to each other by a nib of plastics material as mentioned above in relation to FIGS. 8 and 9. The ejector plates 46 and 50 are both retracted, and in practice are spaced apart.

To initiate ejection, the hydraulic cylinder controlling the rod 54 is actuated to advance the rod 54 and the ejector plate 46 carrying the article ejector pins 48. The connecting nib joining the articles 56 to the deadhead 58 is severed, and the articles 56 are ejected from the male die member 38. They fall down the chute 60 and are guided by the deflector 72 into the branch 64 to enter the bin 68. The ejector plate 46 is at this stage flush with the second ejector plate 50, as seen in FIG. 2.

Figure 5:
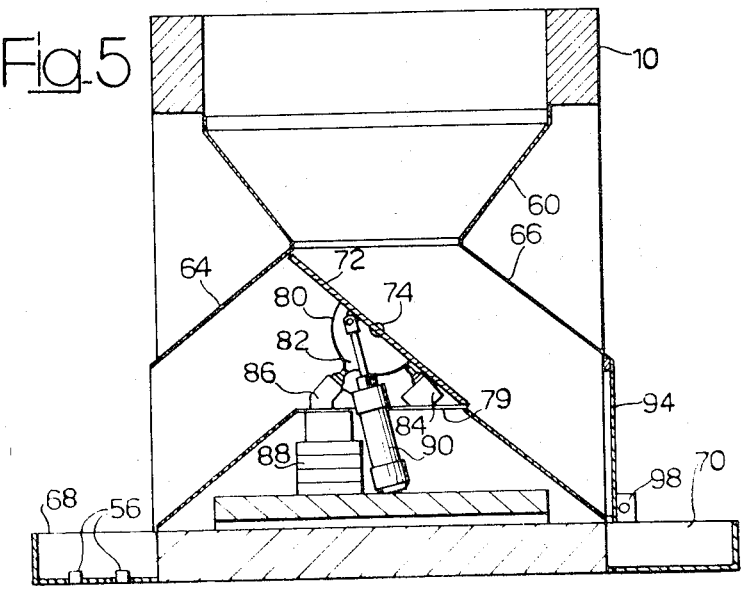
FIG. 5 is a view similar to FIG. 1 of the lower part of the press of the preceding figures, at a different phase in the operating cycle from that seen in FIG. 1.

After sufficient time has passed to ensure the proper descent of the articles 56, a signal is given (by means not illustrated, but which may for example be a limit switch actuated by the rod 54 or a component moving with that rod) to cause the electrovalve 88 to actuate the pneumatic cylinder 90, moving the deflector 72 from its first position (FIG. 1) to its second position (FIG. 5). When the projection 82 on the cam 80 closes the microswitch 86 to signal the arrival of the deflector 72 in its second position the second phase of ejection begins, and the rod 54 completes its advance stroke by advancing the ejector plates 46 and 50 together with each other to the position seen in FIG. 4, in which the plates 46 and 50 are flush with the plate 40. This causes the deadhead 58 to be ejected by the central pin 52 from the male die 38 and to fall down the chute 60. It is guided by the deflector 72 into the branch 66, and enters the bin 70. As it leaves the branch 66 it pushes at least one of the strips 94 away from its normal vertical position, so interrupting the light beam emitted by the emitter 96 and falling on the photo-cell unit 98. This causes an electrical signal to be given to an electrical control device (non illustrated) for the cylinder 22, causing the descent of the brush 26 on its stem 24. The brush 26 sweeps the face of the male die member 38, ensuring that any particle of plastics mistakenly remaining on it, whether an article 56 or a deadhead 58, is dislodged and falls into the chute 60. The cylinder 22 is arranged for the brush 26 to return upwardly immediately it completes its downward movement, and simultaneously with such return movement the rod 54 is retracted by its cylinder, returning the ejector plates 46 and 50 to their fully retracted position. The press is then closed and injection commences for the next articles 56. At this stage the deflector 72 is returned from its second position (FIG. 5) to its first position (FIG. 1).

It is of course possible to use different operating cycles. For instance, using dies of the type seen in FIGS. 6 and 7, the deflector 72 would be in the position seen in FIG. 5 when the press opens, separation of the articles 56 and deadhead 58 occurring at this stage. In the first phase of ejection, the rod 54 and plate 46 are advanced to cause modified ejector pins (not illustrated) on the plate 46 to eject the deadhead 58. The deadhead 58 falls, passing the branch 66 of the chute 60 and entering the bin 70. This causes actuation of the photo-cell 70, which is arranged to give a signal causing the deflector 72 to be moved to the position seen in FIG. 1. The second stage of ejection then takes place, the plates 46 and 50 being advanced together with each other to cause modified ejector pins (not illustrated) on the plate 50 to eject the articles 56. They are guided by the deflector 72 into the branch 64 and enter the bin 68. The brush 26 is then lowered to sweep the male die member 38, and returns upwardly simultaneously with retraction of the ejector plates 46 and 50. The press then closes an injection takes place, the deflector 72 meanwhile being returned to the position seen in FIG. 5.

Another modified construction might provide a deflector which is reciprocable between a retracted and an extended position, defining different paths in these positions for objects falling into the chute 60.

It will noticed that in all cases the articles 56 and deadheads 58 are automatically sorted immediately on ejection from the press, so avoiding manual sorting later.

I claim:

1. An injection-moulding press having means to separate the moulded article from the deadhead to which it is initially joined, said article and said deadhead falling down in a chute, said chute being provided with two branches, with a deflector at the fork of said branches, said deflector being movable between a first position in which the article is guided into a first of said branches to a first container and a second position in which the deadhead is guided into the other of said branches to a second container, said separating means comprising:
  means for ejecting the article, the deflector being in said first position;
  means for moving said deflector from said first position to said second position after a fixed interval of time from said ejection;
  means for ejecting said deadhead when said deflector is in said second position;
  means for generating a signal upon the passage of said deadhead in said branch; and
  means for resetting said deflector in said first position in consequence of said signal.

* * * * *